United States Patent [19]
Honkura et al.

[11] Patent Number: 5,886,070
[45] Date of Patent: Mar. 23, 1999

[54] PRODUCTION METHOD FOR ANISOTROPIC RESIN-BONDED MAGNETS

[75] Inventors: Yoshinobu Honkura, Chita-gun; Hironari Mitarai, Tokai; Koichi Maekawa, Chita; Yoshinobu Sugiura, Handa, all of Japan

[73] Assignee: Aichi Steel Works, Ltd., Tokai, Japan

[21] Appl. No.: 886,509

[22] Filed: Jul. 1, 1997

[30] Foreign Application Priority Data

Jul. 4, 1996 [JP] Japan ...................................... 8-175217

[51] Int. Cl.⁶ ............................. C08K 3/08; B29C 43/56; B29K 103/00
[52] U.S. Cl. .......................... 523/300; 524/431; 524/440; 264/108; 264/429; 264/435; 264/436; 264/DIG. 58; 422/3
[58] Field of Search ............................ 523/300; 524/431, 524/440; 264/429, 436, DIG. 58, 435, 108; 422/3

[56] References Cited

U.S. PATENT DOCUMENTS 3,677,947  7/1972  Ray et al. ................................. 264/58
3,867,299  2/1975  Rohatgi .................................... 264/429

FOREIGN PATENT DOCUMENTS 0 646 937    4/1995   European Pat. Off. .
61-147997    7/1986   Japan .
7-130566     5/1995   Japan .
8-31677      2/1996   Japan .
1 447 264    8/1976   United Kingdom .

OTHER PUBLICATIONS

WPI Abstract Accession No. 93–245925/199331 and JP–5166655A (07/1993)

Primary Examiner—Andrew E.C. Merriam
Attorney, Agent, or Firm—Jacobson, Price, Holman & Stern PLLC

[57] ABSTRACT

The present invention offers a production method for anisotropic resin-bonded magnets with precise dimensions in high productivity. It comprises the aligning step in which the preform is preliminary compression-molded in the preforming molding die 22 in the preforming press 20 with an applied magnetic field to align the magnetization direction of the magnet powder at a temperature in which the thermosetting resin in the compound becomes liquid state, the transferring step in which said preform is transferred from preforming press 20 to densifying molding die 32 in a densifying press 30, and densifying step in which said partly cured preform is compression-molded by applying pressure in a densifying press 30 to obtain desired shape of magnet.

4 Claims, 2 Drawing Sheets

FIG. 1
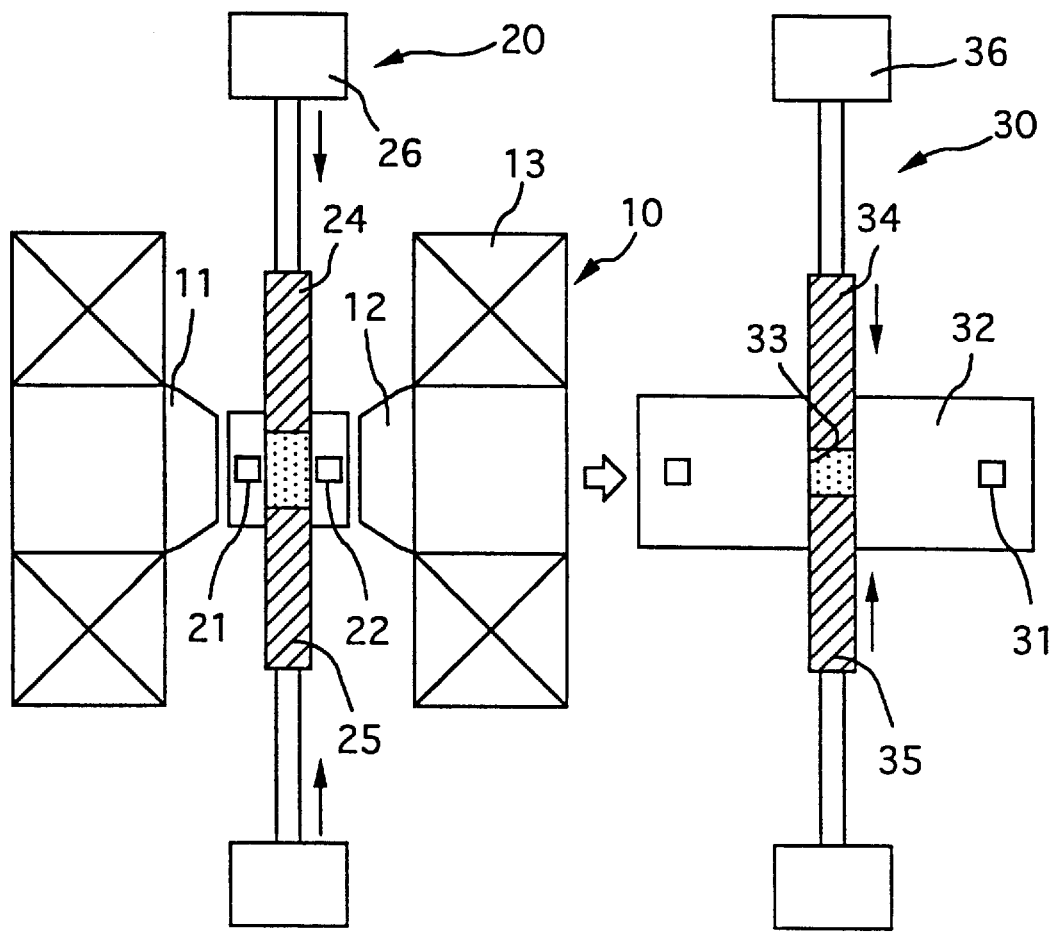
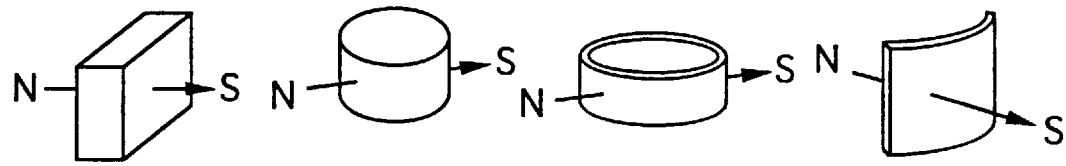
FIG. 2(A)  FIG. 2(B)  FIG. 2(C)  FIG. 2(D)

PRODUCTION METHOD FOR ANISOTROPIC RESIN-BONDED MAGNETS

TECHNICAL FIELD

The present invention relates to a compression molding method for anisotropic resin-bonded magnets.

BACKGROUND ART

Anisotropic resin-bonded magnets, made of magnet powders embedded in resin matrix, are mainly formed by compression molding. In compression molding, the compound which is mixture of magnet powder and resin is filled into a mold and compressed into the desired shape. During the whole compression molding process, the compound is kept in a magnetic field of 8–12 kOe to align the magnetization direction of magnet powder to the direction of magnetic field by letting the magnet powder particles to rotate and displace.

Concerning the compression molding method for the anisotropic resin-bonded magnets, there are two notable Patents that disclose the methods to improve the alignment in the magnet by using rubber mold to provide hydrostatic pressure on the compound. One is Japanese Patent Application Laid-Open (kokai) No. 7-130566. In the invention the compound is preformed in a rubber mold in applied pulse magnetic field of which high intensity introduces high degree of alignment of powder. Then the preform is compression-molded in said rubber mold in a static magnetic field. Rubber mold gives hydrostatic pressure which keeps the degree of alignment in the preform to be high. However the method has following drawbacks.

First, it is difficult to obtain high density because the applied pressure in compression molding must not be more than 0.8–1.5 ton/cm2 to protect the rubber mold from breakage. Insufficient density result in unsatisfactory magnetic properties. Second, precise dimension can not be obtained because of the deformation of the rubber mold under the applied pressure. Third, the method is not applicable to mass production due to wear of rubber mold.

The other patent that utilizes hydrostatic pressure is Japanese Patent Application Laid-Open (kokai) No. 61-147997. In the invention a cold isostatic press is applied in the compression molding with pulse or static magnetic field. The hydrostatic pressure in the process can avoid alignment deterioration and gives the magnet good magnetic properties. However, it is also not applicable to mass production because lifetime of the rubber mold is very short.

In our Japanese Patent Application Laid-Open (kokai) No. 8-31677, we have disclosed other method different from applying hydrostatic pressure to achieve high degree of alignment. In the invention the warm compression molding method is proposed to offer both precise dimension and high degree of alignment. In the process, metal dies instead of rubber mold is used to assure precise dimension. High degree of magnet powder alignment is obtained by applying both magnetic field and pressure on liquid state of resin in which the particles of magnet can align easily to the direction of applied magnetic field. The resin is heated to the temperature at which it is melted into liquid state just before the thermosetting reaction starts. However the achieved density has a certain limitation because it is hard to compress the compound at sufficiently high pressure due to following reason. In the invention the aligning and the densifying must be carried out simultaneously in one mold which is made of soft magnetic material. Soft magnetic material has low compression strength. Therefore sufficient pressure for obtaining high density compact can not be applied. Further this method has a drawback of low productivity, because of long press cycle time that consists of heating, loading, and magnetizing and demagnetizing the electromagnetic coil.

THE PROBLEMS TO BE SOLVED BY THE INVENTION

An object of the invention is to offer a compression molding method of anisotropic resin-bonded magnets which offers magnet with excellent magnetic properties by achieving high degree of alignment, high density, as well as with precise dimensions. Another object of the invention is to improve the productivity of said compression molding.

MEANS OF SOLVING THE PROBLEM

Carrying out an intensive study on the anisotropic magnet powder alignment in the compound, we have discovered that high degree of alignment is obtained by preforming the compound at a relatively low pressure in an applied magnetic field at the temperature in which the resin becomes liquid state for a short period of time and thermosetting reaction sets off immediately. We also have found that, the alignment in the preform in which the thermosetting reaction partly began can be maintained during subsequent compression molding even if applied magnet field is turned off. These facts suggest that the compression molding process in an applied magnetic field can be separated to two steps, the first is to align the magnet powder by applying a magnetic field and the second is to densify the preform by compression. If separated, two different molding apparatus can be assigned to each step. As the result the productivity would be improved more than double because the aligning step and densifying step can be carried out in parallel by two or more different apparatus. The second merit of separated apparatus is that the lifetime of the molding dies becomes longer. In the alignment step, the preforming molding die is made of combination of soft magnetic and non-magnetic materials which are not so hard, however the separated aligning step does not require high pressure and it ensures sufficiently long liftime for the molding die. In the densifying step, high pressure is required, however separated densifying step does not require application of magnetic field so that the molding die can be made of very hard materials such as cemented carbide (WC-Co type alloy) or tool steel (SKD61). The third merit is that the magnetic properties of the produced resin-bonded magnet is improved. The separated steps enables the magnets to have both high degree of alignment and high density.

The present invention is characterized by separating the aligning step and densifying step, and carrying out those steps sequentially in different apparatuses. The invention is based on our discoveries described above. The method consists of the aligning step in which preliminary compression-molding is carried out by heating the compound into the liquid state and magnet powder is aligned by applied magnetic field, the transferring step to transfer the preform into densifying mold in the densifying press, and densifying step in which compression-molding is carried out by applying desired pressure on the partly cured preform in the densifying mold.

In aligning step of this invented compression molding method, a magnetic field is applied at the moment when the resin is melted into liquid state, preferably at the point that viscosity is lowest. In the moment the particles of anisotropic magnet powder are easily rotated and displaced so that their magnetization directions align to the applied magnetic field. Then preliminary compression-molding is carried out at a relatively low pressure to obtain the preform with set dimensions and enough strength to be transferred to the next step. Inside of the preform there are the layers of the chains of aligned magnet powder particles that are surrounded by cured resin in semi-cured resin matrix. The surface of the preform is also covered by cured resin. The reason that some part of the resin is cured is that pressure and temperature is higher at those parts. After the preform is compression-molded again in the densifying mold, the aligned chains remain in the compact because the shell of cured resin protects their existence provided that the direction of compression is normal to the direction of the chains. At the same time the minute voids of air in the matrix are significantly reduced. Thus an anisotropic resin-bonded magnet which has a precise dimensions and high degree of alignment is obtained.

Details of the present invention are described as follows; As mentioned above, the present invention is based on the separated steps in compression molding for anisotropic resin-bonded magnet in which the compound is preliminary compression-molded with an applied magnetic field to align direction of magnet powder and subsequently densifyed in the densifying press into the desired shape. The present invented method consists of aligning step, transferring step and densifying step.

In the aligning step, a preform is compression-molded by preforming press. The preforming press consists of a compression molding press and an electromagnetic field generator. A combination of conventional compression molding press with electromagnet can be used for the preforming press, in this case the required pressurizing ability is much lower than that for the conventional compression mold process. The preforming molding die is made of a combination of non-magnetic material and soft-magnetic material to ensure a high magnetic field in the mold. Those materials have low strength and are unfavorable to bear high pressure in compression molding. In the present invention, the aligning step does not require high pressure so the lifetime of preforming molding die would be sufficiently long.

The compound is prepared by uniformly mixing anisotropic magnet powder of which particle size is 44–425 $\mu$m and thermosetting resin of which particle size is 44 $\mu$m in a kneading machine. As for the thermosetting resin, epoxy resin, phenol resin, or melamine resin can be used. As for the anisotropic powder, rare earth magnet powder is preferable because of its excellent magnetic properties, although ferrite magnet powder can be used. The kinds of rare earth magnet powder are Nd-Fe-B type magnet, Sm-Co type magnet, and Sm-Fe-N type magnet.

Preferable volume ratio of the thermosetting resin to total volume in compound is 10–20 vol %. An increase of the thermosetting resin volume in compound causes deterioration of magnet properties. An decrease of the thermosetting resin volume is apt to cause crack in molded magnet. In addition magnet properties deteriorate because of insufficient magnet powder alignment due to low movability of magnet powder particles in the liquid state resin.

First, the compound is filled into a preforming mold which is kept to a set temperature. The set amount of compound must be filled accurately into the preforming mold to obtain precise dimension of resin-bonded magnet. The temperature of preforming mold is elevated by the heater attached to it. The compound is heated by the conduction from the mold. Other heating method can be applied, for example, a green compact which is compression-molded previously at room temperature is heated outside of preforming mold, then it is inserted into the mold and aligning step is carried out.

After the compound is filled in the mold, the thermosetting resin is melt into liquid state for a short period of time just before thermosetting reaction sets off. A magnetic field and a pressure are applied when the viscosity of resin shows its minimum value. The application of magnetic field must be done before the viscosity of resin increase by curing reaction. The rate of curing reaction or the viscosity of the molten resin are depend on the kind of thermosetting resin and cure accelerator. The suitable thermosetting resin must be chosen for a desired conditions of compression molding. Applied magnetic field and loaded pressure must be controlled according to used thermosetting resin and cure accelerator.

The required intensity of magnetic field is 8–12 kOe to obtain sufficient magnet powder alignment. Either static magnetic field or pulse field can be applied. The required pressure is between 1.0 and 2.0 ton/cm2 to give sufficient strength in the preform. By conditions above mentioned, a preform with enough strength which can be transferred to next step and sufficient anisotropic magnet powder alignment is compression-molded. Preferably the preform is demagnetized to knock out from preforming mold easily. This demagnetization treatment is done by usual method in which reverse magnetic field is applied by electromagnet.

After the aligning step, the preform is transferred to the following step in which densification is carried out in a densifying press. The transfer apparatus is located between the preforming press and densifying press. Some examples for the transferring apparatus are a robot arm or push rod driven by the oil pressure of the press.

Preferably the transferring step should be carried out as quick as possible because the proceeding of curing process in the transferring step should be avoided.

Following to the transferring step, the preform is compression-molded at an elevated temperature, and formed into an anisotropic resin-bonded magnet with desired dimensions and high density. In this densifying step, a conventional compression molding press is used and it is indicated as densifying press in this invention. The pressure of compression molding is set to higher value than that of the aligning press. Preferable pressure is between 7.0 and 10.0 ton/cm2. The preferable temperature is between 150° C. and 180° C. The holding time is between 3 and 10 sec. Selecting these conditions, the magnet powder is bound sufficiently firm.

It is preferable to heat the preform and the molding die because it should be avoided that the preform is cooled in the mold. It is acceptable that the compression molding is carried out in an applied magnetic field.

The densified magnet can be further cured in a furnace after it is knocked out from the mold in the densifying press.

This invention is characterized by separating the aligning step and the densifying step. In the aligning step a preform is preliminary compression-molded in an applied magnetic field with relatively low pressure, then in the densifying step it is compression-molded in a high pressure without applied magnetic field.

An excellent magnetic properties are obtained by the method described above. It is comparable to that of the magnets made by the compression molding method disclosed in our Japanese Patent Application Laid-Open (kokai) No. 8-31677 in which magnetic field and high pressure is applied simultaneously.

The invention reduces the cost of production apparatus by assigning different functions, i.e. application of magnetic field and loading pressure, to different press machines. It also increases productivity of compression molding and give the molding die longer lifetime. Furthermore it offers a precise dimension for the anisotropic resin-bonded magnets.

BRIEF DESCRIPTION OF THE DRAWINGS

FIG. 1: Sectional view of compression molding apparatus used in the embodiments of the present invention.

FIG. 2: Perspective view of magnets produced by the apparatus shown in FIG. 1 with the indication of N-S direction.

EMBODIMENTS

Figure 3A:
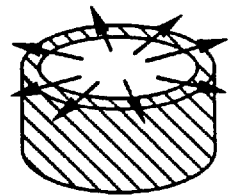
FIG. 3: Perspective view of the magnet which has radial magnetization.
Figure 3B:
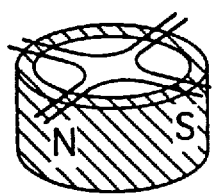

Now the embodiments according to the present invention will be described.

Nd-Fe-B type alloy with a composition of 12.7 at %-Nd, 6.0 at %-B, 17.1 at %-Co, 0.3 at %-Ga, 0.5 at % Zr balanced with Fe was melted in a vacuum induction melting furnace and casted into an ingot. The ingot was heat-treated for 40 hours at 1100° C. to obtain homogenized material.

Then the material was subjected to HDDR (Hydrogenation, Disproprotionation, Desorption, and Recombination) treatment in which hydrogenation is carried out at 800° C. for three hours in a hydrogen atmosphere of 0.5 kgf/cm2, desorption at 800° C. for 30 minutes in a vacuum of 5×10−5 Torr, and quenching is carried out to the room temperature. As a result, aggregation of fine powder was obtained. It was lightly ground in a mortar and magnet powder with average particle diameter of 150 µm was obtained.

The magnet powder coated by coupling agent was mixed with a thermosetting resin which consist of epoxy resin powder (trade name Epicoat 1004 manufactured by Shell Epoxy Co.) as a main powder and diaminodiphenylmethane (DDM, a product of Wako Pure Chemical Co.) as hardening agent and thus the compound was prepared. The ratio of magnet powder and thermosetting resin is 80 volume % and 20 volume %, respectively.

The apparatus used for the present invention is shown in FIG. 1. This apparatus consists of preforming press 20 having magnetic field generator 10 and densifying press 30. The preforming press 20 consists of a preforming molding die 22 which has cylindrical shape and has coaxial through-hole to have a cavity 23 in it, upper punch 24 which is inserted from top opening of preforming molding die 22, lower punch 25 which is inserted from bottom opening of preforming molding die 22, and power supply 26 to compress upper punch 24 and lower punch 25. The preforming molding die 22 has a built-in heater 21.

The magnetic field generator 10 consists of a pair of magnetic poles 11, 12 and electromagnetic coil 13 which supplies magnetic flux to the magnetic poles 11, 12. The preforming molding die 22 is placed between the magnetic poles 11, 12. The preforming molding die 22 is made of Permendur (Fe-Co alloy) or pure iron, and an inner surface of the preforming molding die 22' is made of non-magnetic material. The cross section of the cavity 23 is 7×7 mm.

The densifying press 30 consists of a densifying molding die 32 which has cylindrical shape and has coaxial through-hole to have a cavity 33 in it, upper punch 34 which is inserted from top opening of densifying molding die 32, lower punch 35 which is inserted from bottom opening of densifying molding die 32, and power supply 36 to compress upper punch 34 and lower punch 35. The densifying molding die 32 is made of cemented carbide (WC-Co type alloy) or tool steel (SKD61) and the cross section of cavity 33 is 7×7 mm. The densifying molding die 32 has a built-in heater 31 in it.

An anisotropic resin-bonded magnet is compression-molded in the apparatus described above. The magnet has a 7×7×7 mm square shape of which perspective view is shown in figure FIG. 2 (A). The North and South poles of the magnet are indicated with the arrow in the figure.

First, a preform is compression-molded in the preforming press at 150° C., then immediately transferred into the densifying press by robot arm, and then densified with large pressure in the densifying press at 150° C., which is same temperature as in the alignment step. The temperature of the preforming molding die 22 and densifying molding die 32 were set to 150° C. The conditions except for the temperature for the preforming press and densifying press are shown in table 1. As seen in the table 1, for the sample No. 1–No. 6 the molding pressure in the aligning step was varied from 1.0 to 6.0 ton/cm2, and the applied magnetic field was varied from 10 to 15 kOe. In the densifying step, the pressure of compression molding was kept to constant value of 9.0 ton/cm2 without applied magnetic field.

Sample No. 11–No. 13 in table 1 were made as comparison using the compression molding in which aligning and densifying are carried out simultaneously in the preforming press 20. The set pressure was 8.5 ton/cm2 and the intensity of magnetic field was 10, 15 and 20 kOe.

Time duration for the compression molding was depend on the kind of resin and the compression molding temperature. In this embodiment, it was found that the viscosity of compound is lowest at 20 seconds after it is filled into preforming mold die and the time duration for the compression molding were determined according to the fact.

The sequence in the sample preparation for the sample No. 1–No. 6 is as follows. First, the compound was filled into the cavity 23 in the preforming die 22. Then the applied magnetic field was increased from zero to set values of 10 or 15 kOe in 10 seconds. The magnetic field was kept for 30 seconds after it reached the set value. Simultaneously the applied pressure was increased from zero to set values of 1.0–6.0 ton/cm2 in 20 seconds. The pressure was kept for 10 seconds. Then, the obtained preform is put into the densifying molding die 32 within about 2 seconds after the completion of aligning step, then it is kept in the densifying molding die 32 for 10 seconds to heat the preform to the set temperature of 150° C. Then it was compressed for 20 seconds at the set pressure of 9.0 ton/cm2.

As for the sample No. 11–No. 13, the compound was filled into the cavity 23 in the preforming molding die 22, then the applied magnetic field was increased from zero to set values of 10, 15 or 20 kOe in 10 seconds. The magnetic field was kept for 50 seconds after it reached the set value. Simultaneously the applied pressure was increased from zero to set value of 8.5 ton/cm2 in 20 seconds. The pressure was kept for 30 seconds.

The maximum energy product of the obtained anisotropic resin-bonded magnets are shown in table 2. As shown in table 2, it is seen that the maximum energy product of sample No. 1–No. 6 are comparable to that of sample No. 11–No. 13 although magnetic field was not applied during the densifying step for the sample No. 1–No. 6.

It means that an anisotropic bonded magnet with excellent magnetic property can be obtained by the combination of aligning step and densifying step, in which a preform is preliminary compression-molded in an applied magnetic field with relatively low pressure in the aligning step, then it is compression-molded in a high pressure without applied magnetic field. This separation of aligning step and densifying step enables the preforming molding die to be made of high magnetic saturation material, those materials being unfavorable to bear high pressure for conventional compression molding die. It makes easy to design the mold used in an applied magnetic field.

In the present invention the time durations needed for the aligning step and densifying step are comparable. Therefore by assigning different apparatus for each step, those production steps can be carried out in parallel. It improves the productivity double, that is, in a given time two resin-bonded magnets are produced by the present invented method while only one magnet is produced by the method in which pressure and magnetic field are applied simultaneously in one apparatus. The rate of the operation for the apparatus is doubled by the present invention.

The invented method also gives precise dimension for the anisotropic resin-bonded magnets because the densifying molding die made of high strength hard materials is used in the compression molding.

In the compression molding press as shown in FIG. 1, magnets with the shape of FIG. 2(A), (B), (C) and (D) in which N–S direction is perpendicular to the direction of compression molding can be compression-molded.

TABLE 1

| sample No. | compression molding in the aligning step | | | compression molding in the densifying step | | |
|---|---|---|---|---|---|---|
| | temperature (°C.) | pressure (ton/cm$^2$) | magnetic field (kOe) | temperature (°C.) | pressure (ton/cm$^2$) | magnetic field (kOe) |
| 1 | 150 | 1.0 | 10 | 150 | 9.0 | 0 |
| 2 | 150 | 2.0 | 10 | 150 | 9.0 | 0 |
| 3 | 150 | 3.0 | 10 | 150 | 9.0 | 0 |
| 4 | 150 | 4.0 | 15 | 150 | 9.0 | 0 |
| 5 | 150 | 5.0 | 15 | 150 | 9.0 | 0 |
| 6 | 150 | 6.0 | 15 | 150 | 9.0 | 0 |
| 11 | — | — | — | 150 | 8.5 | 10 |
| 12 | — | — | — | 150 | 8.5 | 15 |
| 13 | — | — | — | 150 | 8.5 | 20 |

TABLE 2

| sample No. | magnetic property (BH)max (MGOe) |
|---|---|
| 1 | 17.5 |
| 2 | 17.6 |
| 3 | 17.2 |
| 4 | 16.7 |
| 5 | 16.5 |
| 6 | 16.5 |
| 11 | 16.5 |
| 12 | 17.0 |
| 13 | 17.5 |

Figure 4:
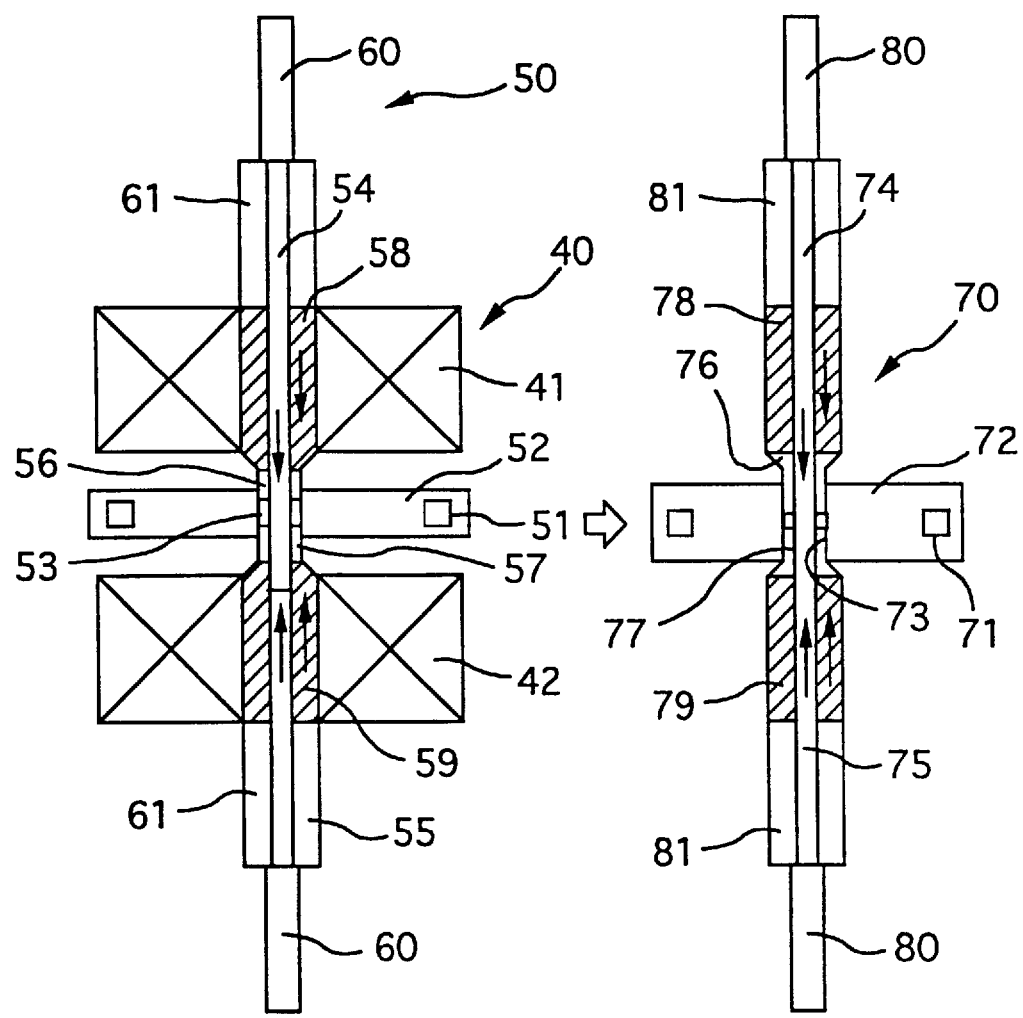
FIG. 4: Sectional view of compression molding apparatus for producing the anisotropic resin-bonded magnet shown in FIG. 3.

Ring magnets with radial magnetization, such as shown in FIG. 3(D) and FIG. 3(E), are produced by the apparatus shown in FIG. 4.

This apparatus consists of preforming press 50 having magnetic field generator 40 and densifying press 70. The preforming press 50 consists of a preforming molding die 52 which is cylindrical and have coaxial through-hole to have a cavity 53 in it, columnar upper core 54 that is inserted from top opening of preforming molding die 52 to butt against columnar lower core 55, columnar lower core 55 that is inserted from bottom opening of preforming molding die 52, cylindrical upper punch 56 that is inserted from top opening of a cylindrical molding space made by inner face of cavity 53 and outer face of upper core 54, cylindrical lower punch 57 that is inserted from top opening of a cylindrical molding space made by inner face of cavity 53 and outer face of lower core 55, upper punch base 58 that is fasten to upper punch 56 by welding, lower punch base 59 that is fasten to lower punch 57 with screws, power supply for core 60 to compress upper core 54 and lower core 55, and power supply for punch 61 to compress upper punch base 58 and lower punch base 59. The preforming die 52 has a built-in heater 51 in it.

The magnetic field generator 40 consists of electromagnetic coils 41, 42 that are placed coaxially with the preforming molding die 52 between. The preforming molding die 52, upper punch 56 and lower punch 57 are made of non-magnetic material, and upper core 54, lower core 55, upper punch base 58 and lower punch base 59 are made of soft magnetic material.

In the preforming press 50, two magnetic circuit is formed. In one of the circuits, the magnetic flux generated by the electromagnetic coil 41 passes through the upper punch base 58, upper core 54 and flows in the centrifugal direction in the cavity 53 and preforming molding die 52, and returns to the electromagnetic coil 41. In the other of the magnetic circuit, the magnetic flux generated by the electromagnetic coil 42 passes through the lower punch base 59, lower core 55 and flows in the centrifugal direction in the cavity 53 and preforming molding die 52, and returns to the electromagnetic coil 42.

Thus in the preforming press 50, the magnetic flux flows in the centrifugal direction in the cavity 53. Therefore the preform of ring-shaped anisotropic resin-bonded magnet has one pole on the inner face and the other pole on the outer face of the ring.

The densifying press 70 consists of a densifying molding die 72 which is cylindrical and have coaxial through-hole to have a cavity 73 in it, columnar upper core 74 that is inserted from top opening of densifying molding die 72 to butt against columnar lower core 75, columnar lower core 75 that is inserted from bottom opening of densifying molding die 72, cylindrical upper punch 76 that is inserted from top opening of a cylindrical molding space made by inner face of cavity 73 and outer face of upper core 74, cylindrical lower punch 77 that is inserted from top opening of a cylindrical molding space made by inner face of cavity 73 and outer face of lower core 75, upper punch base 78 that is fasten with upper punch 76 by welding, lower punch base 79 that is fasten to lower punch 77 with screws, power supply for core 80 to compress upper core 74 and lower core 75, and power supply for punch 81 is to compress upper punch base 78 and lower punch base 79. The densifying molding die 72 has a built-in heater 71.

The densifying press 70 does not have magnetic field generator, because it is to compress the aligned preform that is produced by the preforming press 50 in a higher pressure. The compression molding press shown in FIG. 1 and FIG. 4 which is used in this invention is not necessarily designed and constructed specially. A conventional compression molding press that has a magnetic field generator can be used as the preforming press, and similarly a conventional compression molding press can be used as the densifying press.

What is claimed is:

1. A method for producing an anisotropic resin-bonded magnet, comprising molding a mixture of anisotropic magnet powder and a thermosetting resin in a hot mold by applying a pressure and a magnetic field in a hot mold by applying a pressure and a magnetic field to align the magnetization direction of said anisotropic magnet powder, wherein the improvement comprises:

forming said mixture in a preliminary hot mold by applying a pressure and a magnetic field to align the magnetization direction of said anisotropic magnet powder at a temperature in which the thermosetting resin becomes liquid state and then partly cures, transferring said mixture into a densifying mold in a densifying press, and densifying said partly cured mixture in said densifying mold by applying a pressure which is higher than the pressure in said forming step without said magnetic field.

2. A production method as set forth in claim 1, wherein the preform is demagnetized after the alignment step in which the magnetization direction of said magnet powder is aligned.

3. A production method as set forth in claim 1, wherein a curing step is added by heating the magnet after the densifying step so that the thermosetting reaction in said magnet is completed.

4. A production method as set forth in claim 1, wherein a magnetizing step of said magnet is added.

* * * * *